United States Patent [19]
Niederer

[11] Patent Number: 5,341,283
[45] Date of Patent: Aug. 23, 1994

[54] PROTECTIVE CIRCUIT WITH FEEDBACK CAPABILITY FOR TWO-POINT AND THREE-POINT INVERTERS, AND METHOD OF FEEDING BACK THE PROTECTIVE-CIRCUIT ENERGY

[75] Inventor: Ralph Niederer, Basel, Switzerland

[73] Assignee: Asea Brown Boveri Ltd., Baden, Switzerland

[21] Appl. No.: 96,984

[22] Filed: Jul. 27, 1993

[30] Foreign Application Priority Data

Sep. 5, 1992 [DE] Fed. Rep. of Germany ....... 4229771

[51] Int. Cl.⁵ ............................................ H02M 7/122
[52] U.S. Cl. .......................................... 363/58; 363/28
[58] Field of Search .................. 363/15, 17, 20, 27, 363/28, 50, 55–58, 135, 136

[56] References Cited

U.S. PATENT DOCUMENTS

| | | | |
|---|---|---|---|
| 4,257,092 | 3/1981 | Prines et al. | 363/124 |
| 4,703,411 | 10/1987 | Umbricht | 363/57 |
| 4,769,754 | 9/1988 | Reynolds et al. | 363/28 |
| 5,237,225 | 8/1993 | Gruning | 363/135 |

FOREIGN PATENT DOCUMENTS

| | | |
|---|---|---|
| 3518478A1 | 2/1986 | Fed. Rep. of Germany . |
| 3513239A1 | 10/1986 | Fed. Rep. of Germany . |
| 3714175C2 | 11/1988 | Fed. Rep. of Germany . |
| 3717488C2 | 12/1988 | Fed. Rep. of Germany . |
| 3833700A1 | 5/1989 | Fed. Rep. of Germany . |
| 3833700C2 | 5/1989 | Fed. Rep. of Germany . |
| 393711A1 | 5/1990 | Fed. Rep. of Germany . |
| 3937111 | 5/1990 | Fed. Rep. of Germany . |

*Primary Examiner*—Steven L. Stephan
*Assistant Examiner*—Matthew Nguyen
*Attorney, Agent, or Firm*—Oblon, Spivak, McClelland, Maier & Neustadt

[57] ABSTRACT

In a two-point or three-point inverter, a feedback circuitry is provided, which is disposed in parallel with a feedback capacitor (CR), and essentially include a semiconductor valve (SR) and a transformer (TR). As a result of switching the semiconductor valve (SR) once, the energy of the protective-circuit reactances, which have been stored in the feedback capacitor, is fed back into the link-circuit voltage source by the transformer. The arrangement according to the invention is distinguished by a high efficiency, accompanied at the same time by high turn-on/turn-off frequency of the semiconductor switch.

10 Claims, 5 Drawing Sheets

PROTECTIVE CIRCUIT WITH FEEDBACK CAPABILITY FOR TWO-POINT AND THREE-POINT INVERTERS, AND METHOD OF FEEDING BACK THE PROTECTIVE-CIRCUIT ENERGY

BACKGROUND OF THE INVENTION

1. Field of the Invention

The invention relates to the field of power electronics. It relates to a protective circuit with feedback capability for two-point inverters or three-point inverters. The invention furthermore relates to a method of feeding back the energy stored in the protective circuit.

2. Discussion of Background

In order that the semiconductor switches of high-power inverters are not destroyed by excessively high current rise (di/dt) or voltage rise (du/dt), they have to be protected by a protective circuit ("snubber"). In addition, the protective circuit must be designed so that a short turn-on/turn-off duration is achieved for the semiconductor switches and the semiconductor switches are stressed by as little peak voltage as possible during turn-off. A large number of circuit proposals already exist for such protective circuits.

It is particularly advantageous if the protective circuits operate in as loss-free a manner as possible. This is best achieved if the energy stored in the protective-circuit capacitors and protective-circuit coils can be fed back again into the direct-current source. Such a protective circuit with feedback capability for two-point inverters has already been disclosed in DE 39 37 111; a protective circuit with feedback capability for three-point inverters has already been disclosed in DE 38 33 700.

In these two publications, the energy stored in the protective circuit is fed back via a DC/DC converter into the direct-current source, i.e. the so-called link capacitor. As a result, the circuit becomes active and has low loss. In this case, the DC/DC converter preferably comprises a transformer with two primary windings and a secondary winding. The unidirectional connections of the primary winding are each connected via a feedback diode to one input of the DC/DC converter in each case. A feedback capacitor and a resistor are connected in parallel at the input of the DC/DC converter. The secondary winding of the three-winding transformer is connected to the link-circuit voltage via a full-wave rectifier comprising four diodes. The power loss produced, which is capable of feedback, is dissipated in the resistor connected in parallel at the input of the DC/DC converter.

A disadvantage of this circuit is that the resistor limits the efficiency of the circuit. Equally, excessively large values have to be accepted for the turn-on/turn-off duration. Although a larger resistance results, on the one hand, in a better efficiency, the energy can no longer, on the other hand, be removed so rapidly because of the increased time constant; specifically, the semiconductor switches can be switched again only after the protective-circuit energy has been removed. An increasing amount of energy will otherwise be stored in the protective circuit and there would be the risk of destruction. A longer turn-on/turn-off duration of the semiconductor switches has therefore to be accepted.

SUMMARY OF THE INVENTION

Accordingly, one object of the invention is to provide a two-point and a three-point inverter having a protective circuit with feedback capability, in which circuit a high efficiency, with ideal components 100%, is achieved, and the turn-on/turn-off duration of the semiconductor switches is not limited by the increase in the efficiency.

A method of feeding back the protective-circuit energy is furthermore provided.

The essence of the invention is that the feedback means are connected in parallel with the feedback capacitor and essentially comprise a transformer and a semiconductor valve. By switching the semiconductor valve once, the energy stored in the feedback capacitor is fed back into the link capacitor by means of the transformer.

According to a preferred exemplary embodiment, the feedback means are so designed that, with a turn-off semiconductor valve, the entire protective-circuit energy is fed back, i.e. energy is no longer converted into heat. As a result, a theoretical efficiency of 100% is achieved.

The advantage of the construction according to the invention is therefore that a very high efficiency is achieved without the turn-on/turn-off frequency of the semiconductor switches being limited.

Further exemplary embodiments emerge from the subclaims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Figure 1:
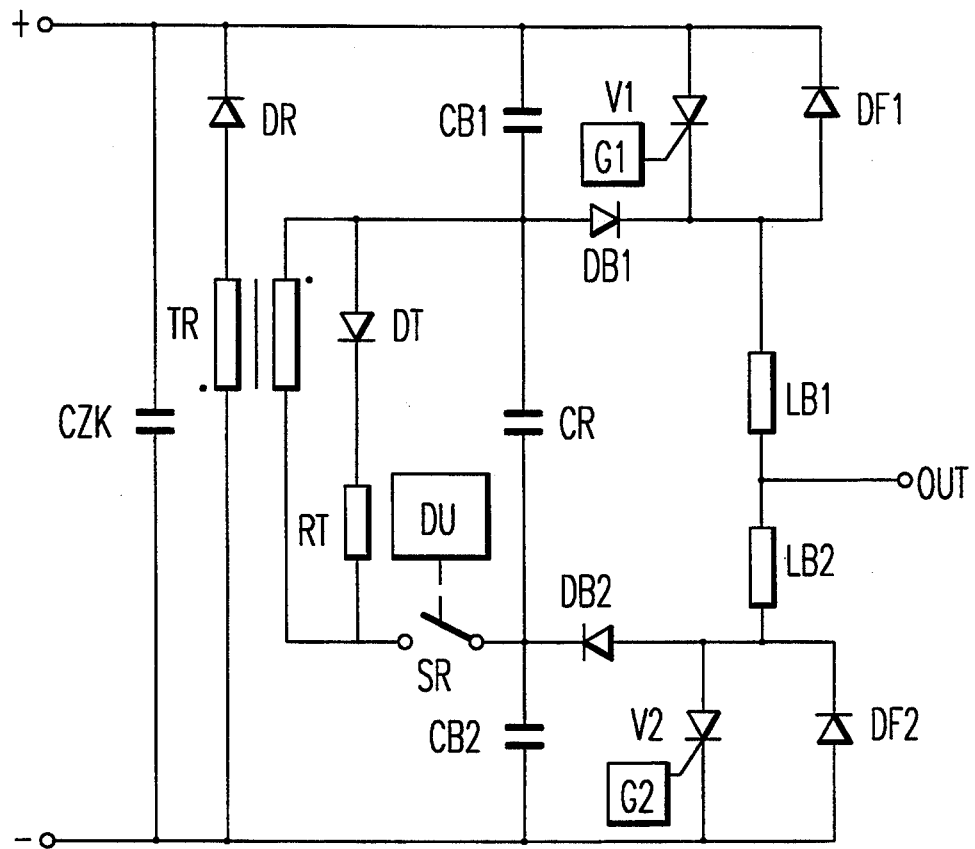
FIG. 1 shows the circuit diagram of a two-point inverter according to the invention.

The reference symbols used in the drawings and their meaning are listed in summarized form in the list of designations.

DESCRIPTION OF THE PREFERRED EMBODIMENTS

Referring now to the drawings, wherein like reference numerals designate identical or corresponding parts throughout the several views, FIG. 1 shows the circuit diagram of a two-point inverter with protective circuit according to the invention and with feedback capability. Connected to a direct voltage, which may be connected to the positive and negative input (+ and −), is a series circuit of two semiconductor switches (V1, V2) with current-rise limiting chokes (LB1, LB2) connected in-between. The direct voltage may, for example, be the link-circuit voltage of a converter. The semiconductor switches (V1, V2) are preferably turn-off valves, in particular gate-turn-off thyristors (GTO). The semiconductor switches (V1, V2) are each driven by a gate unit (G1, G2). Disposed between the two current-rise limiting chokes (LB1, LB2) is the output (OUT). Of course, the current-rise limiting chokes may also be designed as a single choke; the output connection would then be formed by a center tap of the single choke. A free-wheeling diode (DF1, DF2) is connected in antiparallel with each semiconductor switch (V1, V2). To limit the voltage rise across the semiconductor switches (V1, V2), a series circuit comprising a load-reducing diode (DB1, DB2) and a load-reducing capacitor (CB1, CB2) is disposed in each case in parallel with the switches (V1, V2). In the case of the first semiconductor switch (V1), the anode of the switch is connected to the load-reducing capacitor (CB1) and the positive input (+), while the cathode of the switch is connected to the cathode of the load-reducing diode (DB1) and the current-rise limiting choke (LB1). In the case of the second semiconductor switch (V2), the cathode is connected to the negative input (−) and the load-reducing capacitor (CB2), while the anode is connected to the anode of the load-reducing diode (DB2) and the current-rise limiting choke (LB2).

Situated between the connection points of the load-reducing capacitors (CB1 and CB2, respectively) and the load-reducing diode (DB1 and DB2, respectively) and essentially in parallel with the current-rise limiting chokes (LB1, LB2) is a feedback capacitor (CR). In the case of a protective circuit without feedback capability, a resistor would be present instead of the feedback capacitor (CR). The energy stored in the current-rise limiting chokes (LB1, LB2) and the load-reducing capacitors (CB1, CB2) would be dissipated in said resistor when the semiconductor switches (V1, V2) are switched. In the present protective circuit with feedback capability it is stored in the feedback capacitor (CR) and is consequently available for feedback.

The feedback means are disposed in parallel with the feedback capacitor (CR) and comprise a semiconductor valve (SR) and a series circuit of a resistor (RT) and a diode (DT) on the primary side of the transformer (TR) and a feedback diode (DR) on the secondary side of the transformer (TR). The semiconductor valve is driven by a drive unit (DU) and is connected by means of its first terminal to the cathode of the load-reducing diode (DB2), the feedback capacitor (CR) and the load-reducing capacitor (CB2) and by means of its second terminal to one terminal of the primary winding of the transformer (TR). In this circuit, the drive unit (DU) may be supplied from the feedback capacitor (CR). The other terminal of the primary winding is connected to the anode of the load-reducing diode (DB1), the feedback capacitor (CR) and the load-reducing capacitor (CP1). The series circuit of the resistor (RT) and the diode (DT) is disposed in parallel with the primary winding in such a way that the anode of the diode (DT) is connected to the anode of the load-reducing diode (DB1). The secondary winding is connected in series with a feedback diode (DR). The cathode of the feedback diode is connected to the positive input (+) while the secondary winding is connected to the negative input (−). This series circuit of feedback diode (DR) and secondary winding of the transformer (TR) is in parallel with the smoothing capacitor of the link circuit, the so-called link capacitor (CZK).

Figure 3:
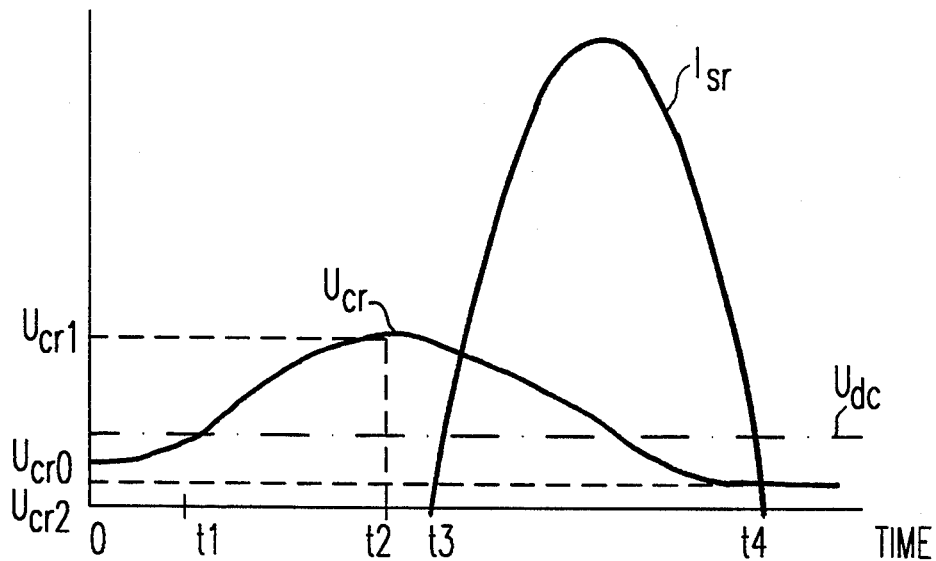
FIG. 3 shows the qualitative variation in the voltage across CR (Ucr) and the current through SR (Isr) with non-turn-off semiconductor valve.
Figure 4:
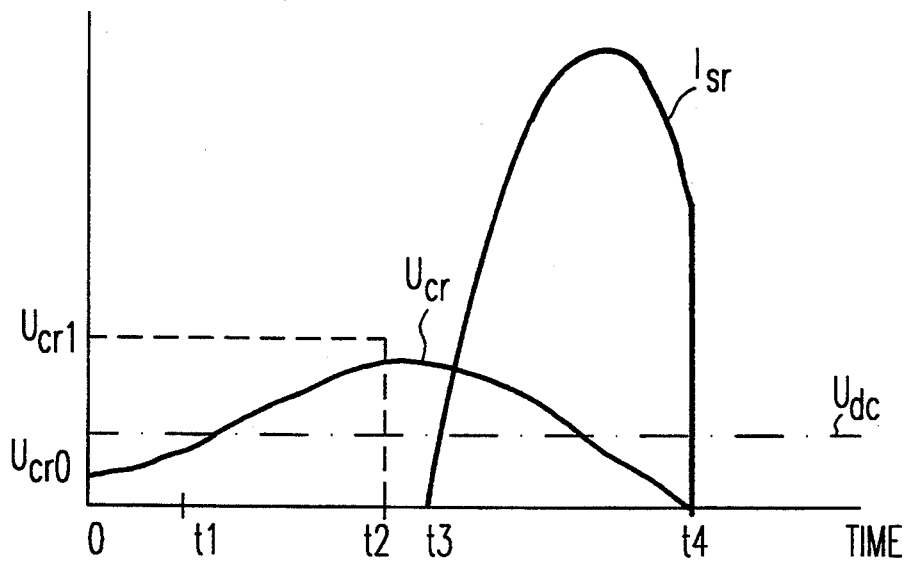
FIG. 4 shows the qualitative variation in the voltage across CR (Ucr) and the current through SR (Isr) with turn-off semiconductor valve.

The mode of operation of the two-point inverter comprising the protective circuit according to the invention will be explained by reference to FIGS. 1, 3 and 4.

In a two-pole two-point inverter, of which a half-bridge is shown in FIG. 1, the semiconductor pairs are alternately switched so that the voltage + or − is alternately applied to the output (OUT). In a half bridge as shown in FIG. 1, the semiconductor switches (V1 and V2) are alternately turned on and off. During this turning-on and turning-off, the semiconductor switches (V1, V2) have to be protected against unduly rapid current or voltage changes. This is done by the protective circuit described above. Since the protective circuit involves reactances (current-rise limiting chokes and load-reducing capacitors), energy is stored in the protective circuit, the so-called protective-circuit energy. Said energy should be fed back into the direct-voltage source, for example the link-circuit voltage. When the semiconductor switches (V1, V2) are switched, the protective-circuit energy is transferred to the feedback capacitor (CR). In detail, the following steps take place (FIG. 3):

Let the semiconductor valve (SR) be a non-turn-off thyristor.

Let CR be charged to Ucr0 at time instant t1.

The semiconductor switches (V1, V2) switch and CR charges to Ucr1 during t1 ... t2. The protective-circuit losses stored during the switching operation are $Q = \frac{1}{2}CR*Ucr1^2 - \frac{1}{2}CR*Ucr0^2$.

At the time instant t3, the semiconductor valve (SR) is turned on. CR consequently discharges via the transformer (TR) to Ucr2 2 Udc−Ucr1. The discharge current (Isr) flows through the semiconductor valve (SR) and is transformed by the transformer (TR) to the secondary side.

On the secondary side, the energy is fed back into the link capacitor (CZK).

At the time instant t4, the current through SR becomes zero, i.e. SR turns off again.

The energy stored in the transformer winding is dissipated in the resistor RT.

It is also possible to turn on SR before the time instant t2. The only condition is that Ucr>Udc. The above processes are superimposed in this case. However, the final value of Ucr (Ucr2) does not change.

It must be ensured that Ucr2>0, i.e. Ucr1<2*Udc. The following condition applies to the feedback capacitor and Udc:

most unfavourable case: $Ucr0 = Udc1$ and $Q = Q_{max}$
→ $Q_{max} < 1.5*CR*Udc^2$
($Udc1$ = link-circuit voltage referred to primary side)

If a turn-off component (GTO, IGBT) is used as semiconductor valve (SR), the valve must be opened shortly before Ucr becomes <0. The condition that $Q_{max} < 1.5*CR*Udc^2$ then no longer has to be fulfilled. The voltage variations with such a semiconductor valve are shown in FIG. 4.

If a turn-off semiconductor valve (SR) is used, a preferred embodiment is distinguished by the fact that the resistor (RT) is replaced by a capacitor (CT). The capacitor is connected between the anode of the feedback diode (DT) and the common node of the load-reducing capacitor (CB1), the load-reducing diode (DB1) and the secondary winding. Provided in parallel with the capacitor (CT) is a series circuit of an inductor (LCT) and a further diode (DCT). The diode (DCT) is disposed in such a way that its anode is connected to the anode of the load-reducing diode (DB1).

Figure 5:
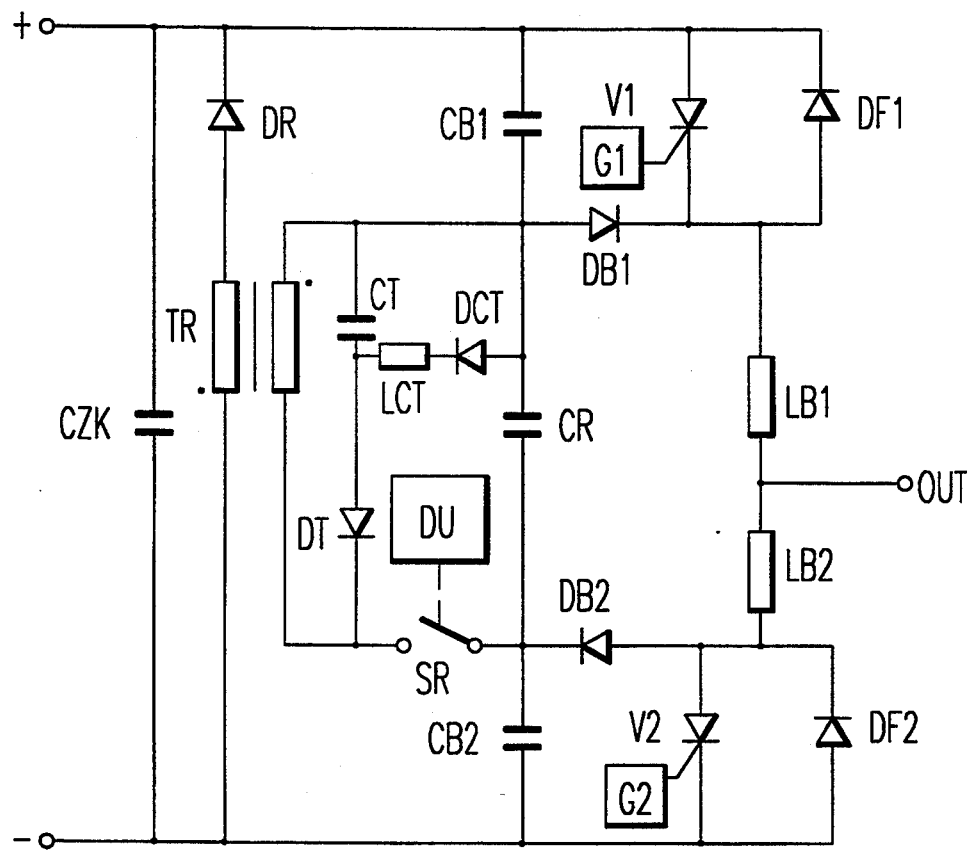
FIG. 5 shows the circuit diagram of a preferred embodiment of a two-point inverter.

This embodiment is shown in FIG. 5. As is immediately obvious, this circuit no longer contains a single ohmic resistor. It is therefore possible to achieve an efficiency of theoretically 100%. The energy stored in the transformer inductance is no longer dissipated in the resistor (RT) but is fed into CT and can also be fed back during the next switching of the semiconductor valve (SR).

In detail, the following additional steps take place:
After SR turns off, the current flows through the primary winding of the transformer and through CT and DT. During this process, CT is positively charged until the transformer current becomes zero. The energy stored in the transformer inductance has consequently been relocated on CT (voltage>0).

As a result of this positive voltage, the diode (DCT) becomes conducting and the voltage across CT reverses as a result of LCT. The energy is again stored in CT, but the voltage across CT is negative.

During the next switching of SR, this energy stored in CT can now also be fed back.

This embodiment is therefore distinguished by the fact that ohmic resistors are no longer present and the entire protective-circuit energy can be fed back without loss into the link capacitor (CZK).

Figure 2:
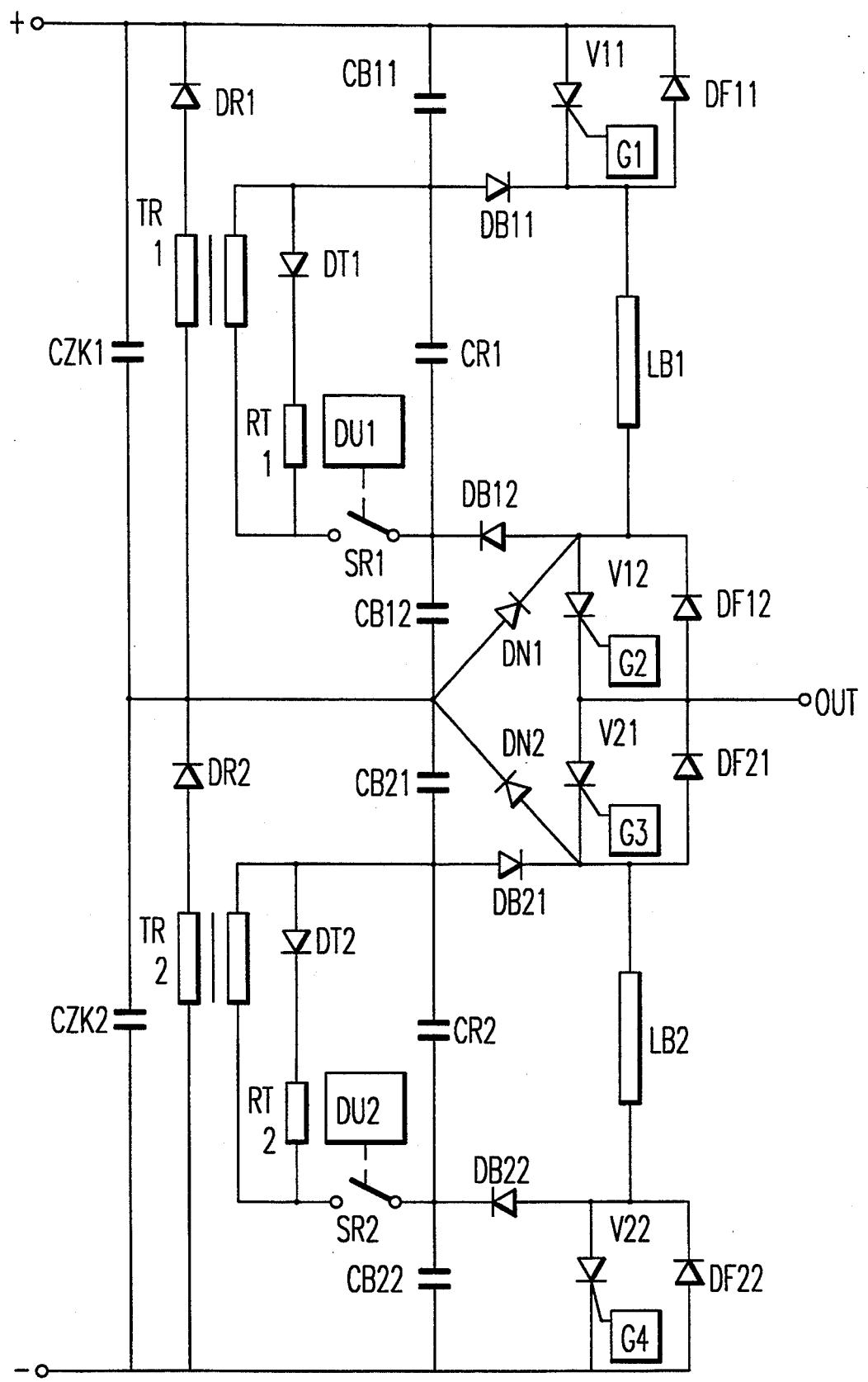
FIG. 2 shows the circuit diagram of a three-point inverter according to the invention.

FIG. 2 shows the circuit diagram of a half-bridge of a three-point inverter. In contrast to the two-point inverter, which has only two stable circuit states, a three-point inverter has three stable circuit states.

A three-point inverter half-bridge is constructed from four semiconductor switches (V11, V12, V21, V22). In every circuit stage, two semiconductor switches are turned on. In the first circuit state, the positive link-circuit voltage is applied to the output (OUT) via the first (V11) and the second (V12) switches or their antiparallel free-wheeling diodes (DF11, DF12). In the second circuit state, the link-circuit center point is connected to the output (OUT) via the second (V12) and the third (V21) switches or their antiparallel free-wheeling diodes (DF12, DF21). Finally, in the third circuit state, the negative linkcircuit voltage is applied to the output (OUT) via the third switch (V21) and the fourth switch (V22) or their antiparallel free-wheeling diodes (DF21, DF22).

In each case a free-wheeling diode (DF11, DF12, DF21, DF22) is connected in antiparallel with the four semiconductor switches (V11, V12, V21, V22). As in the case of the two-point inverter, the switches are protected against unduly rapid voltage rise by means of load-reducing capacitors (CB11, CB12, CB21, CB22) and load-reducing diodes (DB11, DB12, DB21, DB22).

In each case, a current-rise limiting choke (LB1 or LB2, respectively) is connected in series between the switches V11 and V12, or V21 and V22, respectively. The switches V12 and V21 form a series circuit, the cathode of the switch V12 being connected to the anode of the switch V21. This connecting point also forms the output (OUT). In order that the link-circuit center point can be connected to the output (OUT), the anode of the switch V12 and the cathode of the switch V21 are connected via one diode in each case (DN1 and DN2, respectively), to the link-circuit center point. The connection is such that the cathode of DN1 is connected to the anode of V12, and the anode of DN2 is connected to the cathode of V21. The link-circuit center point is formed by the common node of the split link capacitor (CZK1, CZK2).

As FIG. 2 shows, a three-point inverter comprises two identical parts which are each essentially constructed like a two-point inverter. Two feedback circuit parts, which are of the same construction as in the case of the two-point inverter, are therefore necessary.

One feedback capacitor (CR1, CR2) in each case is disposed between the load-reducing capacitors CB11 and CB12, or CB21 and CB22. In parallel therewith are the feedback means, which again comprise a semiconductor valve (SR1 or SR2, respectively), a transformer (TR1 or TR2, respectively) and a series circuit, situated in parallel with the primary winding, of a diode (DT1 or DT2, respectively) and a resistor (RT1 or RT2, respectively). The secondary winding of the first transformer (TR1) is connected via a diode (DR1), on the one hand, to the positive input (+) and, on the other hand, to the link-circuit center point. The secondary winding of the second transformer (TR2) is connected via a diode (DR2) on the one hand, to the link-circuit center point and, on the other hand, to the negative input (−).

The protective-circuit energy is fed back in an analogous way to the two-point inverter: the energy stored in the protective-circuit reactances (CB11, CB12, CB21, CB22, LB1, LB2) is again transferred to the associated feedback capacitor (CR1, CR2). After the semiconductor switches (V11, V12, V21, V22) have switched, this protective-circuit energy is fed back by the semiconductor valves (SR1, SR2) switching once into the split link capacitor (CZK1, CZK2).

Figure 6:
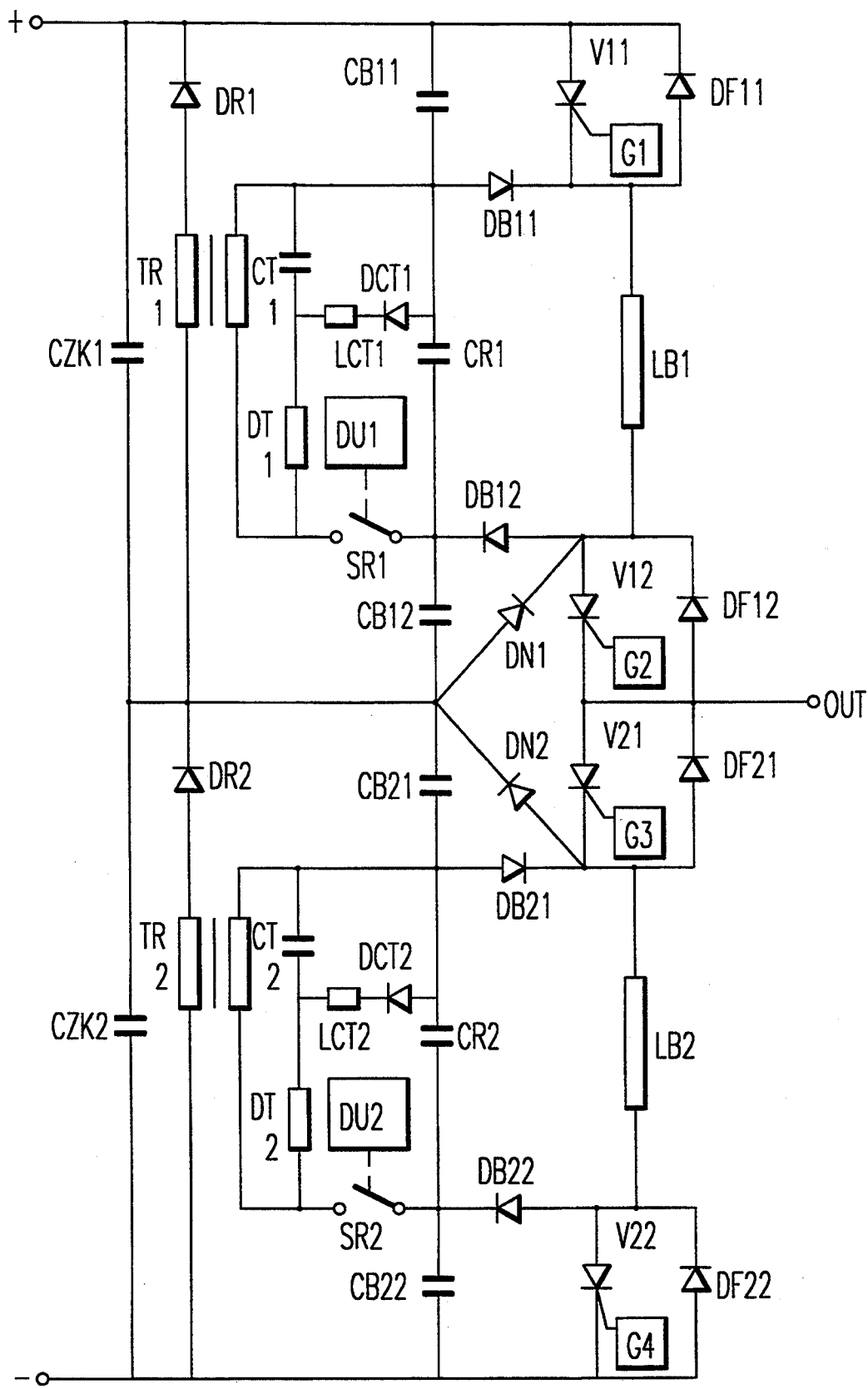
FIG. 6 shows the circuit diagram of a preferred embodiment of a three-point inverter.

A preferred embodiment of a three-point inverter is shown in FIG. 6. In an analogous way to the two-point inverter (FIG. 5), the resistors (RT1 and RT2) are each replaced by a parallel circuit of a capacitor (CT1 and CT2) and a series circuit of an inductor (LCT1 and LCT2) and a diode (DCT1 and DCT2). The circuit functions in the same way as that of the two-point inverter. A detailed explanation of the principle of operation can therefore be omitted here. As a result of the omission of ohmic components, a theoretical efficiency of 100% is also achieved in this special embodiment.

Common to the feedback method for the two inverter types, two-point inverter and three-point inverter, is therefore the fact that
the protective-circuit energy is transferred during the switching of the semiconductor switches (V1, V2, V11, V12, V21, V22) to the feedback capacitors (CR, CR1, CR2);
after the semiconductor switches (V1, V2, V11, V12, V21, V22) have switched, the feedback capacitor (CR, CR1, CR2) is discharged via the transformer (TR, TR1, TR2) as a result of the semiconductor valves (SR, SR1, SR2) switching once;
this discharge current is transformed to the secondary side and charges the link capacitor (CZK, CZK1, CZK2) via the feedback diode (DR, DR1, DR2);
the energy stored in the transformer inductance is dissipated in the resistor (RT, RT1, RT2) or is transferred to the capacitor (CT, CT1, CT2).

Since only the energy stored in the transformer inductance is dissipated, the efficiency of the arrangement according to the invention is very high.

In the special embodiment shown in FIGS. 5 and 6, the energy stored in the transformer inductance is not dissipated in the resistor (RT, RT1 or RT2) but is transferred to the capacitor (CT, CT1 or CT2), relocated and fed back during the next switching process. The efficiency of these embodiments, which no longer comprise ohmic components, is theoretically even 100%.

Common to all the circuits is the fact that the feedback process takes place very rapidly since the resonance circuit formed by the feedback capacitor and the transformer determines the time constant of the process. The protective-circuit energy can be very rapidly removed in this way. Consequently, high turn-on/turn-off frequencies of the semiconductor switches are achieved, accompanied simultaneously by high efficiency. These two parameters can be optimized essentially independently of one another.

The invention therefore has an optimum construction in relation to the minimum turn-on and turn-off duration of the semiconductor switches and maximum efficiency.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A two-point inverter, comprising
   a) a positive and a negative input (+, −) to which a direct-voltage source can be connected;
   b) two semiconductor switches (V1, V2), in antiparallel with which one free-wheeling diode (DF1, DF2) is connected in each case and which are driven by one gate unit (G1, G2) in each case, the anode of the first semiconductor switch (V1) being connected to the positive input (+) and the cathode of the second semiconductor switch (V2) being connected to the negative input (−);
   c) two current-rise limiting chokes (LB1, LB2) which are connected in series between the two semiconductor switches (V1, V2) and serve to limit the current rise in the semiconductor switches;
   d) an output (OUT) which is disposed between the two current-rise limiting chokes (LB1, LB2);
   e) two load-reducing capacitors (CB1, CB2) which are disposed in parallel with the semiconductor switches (V1, V2) via one load-reducing diode (DB1, DB2) in each case and serve to limit the voltage rise across the semiconductor switch, the cathode of the load-reducing diode (DB1) being connected to the cathode of the semiconductor switch (V1) and the anode of the load-reducing diode (DB2) being connected to the anode of the semiconductor switch (V2);
   f) a feedback capacitor (CR) which is disposed between the anode of the load-reducing diode (DB1) and the cathode of the load-reducing diode (DB2);
   g) a link capacitor (CZK) which is disposed between the positive input (+) and the negative input (−); and
   h) means for feeding back the energy stored in the current-rise limiting chokes (LB1, LB2) and load-reducing capacitors (CB1, CB2);
   wherein the means for feeding back
   i) are connected in parallel with the feedback capacitor (CR) and comprise:
   j) a semiconductor valve (SR) which is driven by a drive unit (DU) and is connected to the feedback capacitor (CR), the cathode of the load-reducing diode (DB2) and the load-reducing capacitor (CB2);
   k) a transformer (TR) whose primary winding is connected, on the one hand, to the semiconductor valve (SR) and, on the other hand, to the feedback capacitor (CR), the anode of the load-reducing diode (DB1) and the load-reducing capacitor (CB1), and whose secondary winding is connected, on the one hand, to the positive input via a feedback diode (DR) and, on the other hand, directly to the negative input, the anode of the feedback diode (DR) being connected to the secondary winding of the transformer (TR); and
   l) a series circuit of a diode (DT) and a resistor (RT), which circuit is connected in parallel with the primary winding in such a way that the anode of the diode (DT) is connected to the anode of the load-reducing diode (DB1).

2. The inverter as claimed in claim 1, wherein turn-off valves, in particular gate-turn-off thyristors are used as semiconductor switches (V1, V2).

3. The inverter as claimed in claim 1 or 2, wherein non-turn-off valves, in particular thyristors, are used as semiconductor valves (SR).

4. The inverter as claimed in claim 1 or 2, wherein turn-off valves, in particular bipolar transistors, IGBTs or GTOs, are used as semiconductor valves (SR).

5. The inverter as claimed in claim 4, wherein, instead of the resistor (RT), a parallel circuit of a capacitor (CT) and a series circuit comprising a diode (DCT) and an inductor (LCT) is disposed between the anode and the feedback diode (DT) and the con, non node of the load-reducing diode (DB1), the load-reducing capacitor (CB1) and the feedback capacitor (CR), the anode of the diode (DCT) being connected to the anode of the load-reducing diode (DB1).

6. A three-point inverter comprising
   a) a positive and a negative input (+, −) to which a direct voltage source can be connected;
   b) four semiconductor switches (V11, V12, V21, V22) with which one free-wheeling diode (DF11, DF12, DF21, DF22) is connected in antiparallel in each case and which are driven by a gate unit (G1, G2, G3, G4) in each case, the anode of the first semiconductor switch (V11) being connected to the positive input and the cathode of the fourth semiconductor switch (V22) being connected to the negative input, and the second semiconductor switch (V12) being connected by means of its cathode to the anode of the third semiconductor switch (V21);
   c) two current-rise limiting chokes (LB1, LB2) which serve to limit the current rise in the semiconductor switches (V11, V12, V21, V22), the first inductor (LB1) being connected in series between the cathode of the first semiconductor switch (V11) and the anode of the second semiconductor switch (V12) and the second inductor (LB2) being connected in series between the cathode of the third semiconductor switch (V21) and the anode of the fourth semiconductor switch (V22);
   d) an output (OUT) which is disposed between the semiconductor switches (V12) and (V21);
   e) four load-reducing capacitors (CB11, CB12, CB21, CB22) which are disposed in parallel with the semiconductor switches (V11, V22) or with the series circuit of the semiconductor switches (V12 and V21) via one load-reducing diode (DB11, DB22 or DB12, DB21) in each case and serve to limit the voltage rise across the semiconductor switch, the cathode of the load-reducing diode (DB11) being connected to the cathode of the semiconductor switch (V11) and the anode of the load-reducing diode (DB12) being connected to the anode of the semiconductor switch (V12), or the cathode of the load-reducing diode (DB21) being connected to the cathode of the semiconductor switch (V21) and the anode of the load-reducing diode (DB22) being connected to the anode of the semiconductor switch (V22);

f) two feedback capacitors (CR1 and CR2, respectively) which are disposed between the anode of the load-reducing diode (DB11) and the cathode of the load-reducing diode (DB12), or between the anode of the load-reducing diode (DB21) and the cathode of the load-reducing diode (DB22);

g) two diodes (DN1, DN2) which are connected in series, the anode of the second diode (DN2) being connected to the cathode of the third semiconductor switch (V21), the cathode of the first diode (DN1) being connected to the anode of the second semiconductor switch (V12), and the anode of the first diode (DN1) or the cathode of the second diode (DN2) being connected to the con, non node of the loading-reducing capacitors (C12, C21);

h) two link capacitors (CZK1 and CZK2) which are connected in series in such a way that the first terminal of the series circuit is connected to the positive input (+), the second terminal of the series circuit is connected to the negative input (−) and their con, non node is connected to the common node of the load-reducing capacitors (CB12, CB21); and i) means for feeding back the energy stored in the current-rise limiting chokes (LB1, LB2) and the load-reducing capacitors (CB11, CB12, CB21, CB22);

wherein the feedback means j) are connected in parallel with the respective feedback capacitor (CR1 or CR2) and each comprise k) a semiconductor valve (SR1 or SR2) which is driven by a drive unit (DU1 or DU2) and connected to the feedback capacitor (CR1 or CR2), the cathode of the load-reducing diode (DB12 or DB22) and the load-reducing capacitor (CB12 or CB22);

l) a transformer (TR1 or TR2) whose primary winding is connected, on the one hand, to the second terminal of the semiconductor valve (SR1 or SR2) and, on the other hand, to the feedback capacitor (CR1 or CR2), the anode of the load-reducing diode (DB11 or DB21) and the load-reducing capacitor (CB11 or CB21), the secondary winding of the transformer (TR1) being connected, on the one hand, via a diode (DR1) to the positive input and, on the other hand, to the secondary winding of the other transformer (TR2) and to the common contact point of the diodes (DN1 and DN2), and the secondary winding of the second transformer (TR2) being connected, on the one hand, via a diode (DR2) to the secondary winding of the transformer (TR1) and, on the other hand, directly to the negative input;

m) a series circuit of one diode (DT1 or DT2) and one resistor (RT1 or RT2) in each case which is connected in parallel with the respective primary winding in such a way that the anode of the diode (DT1) is connected to the anode of the load-reducing diode (DB11) and the anode of the diode (DT2) is connected to the anode of the load-reducing diode (DB21).

7. The inverter as claimed in claim 6, wherein turn-off valves, in particular gate-turn-off thyristors are used as semiconductor switches (V11, V12, V21, V22).

8. The inverter as claimed in claim 6 or 7, wherein non-turn-off valves, in particular thyristors, are used as semiconductor valves (SR1, SR2).

9. The inverter as claimed in claim 6 or 7, wherein turn-off valves, in particular bipolar transistors, IGBTs or GTOs, are used as semiconductor valves (SR1, SR2).

10. The inverter as claimed in claim 9, wherein, instead of the resistors (RT1 or RT2), one parallel circuit of a capacitor (CT1 or CT2) and a series circuit comprising an inductor (LCT1 or LCT2) and a diode (DCT1 or DCT2) is disposed in each case between the anode of the respective feedback diode (DT1 or DT2) and the respective common node of the load-reducing diodes (DB11 or DB21), the load-reducing capacitors (CB11 or CB21) and the feedback capacitors (CR1 or CR2), the anodes of the diodes (DT1 or DT2) being connected to the anodes of the diodes (DB11 or DB21).

* * * * *